(12) United States Patent
Turtzo

(10) Patent No.: US 6,578,285 B2
(45) Date of Patent: Jun. 17, 2003

(54) DEVICE FOR REMOVING GREASE FROM THE SURFACE OF A FOOD ITEM

(76) Inventor: Brian G. Turtzo, 101 S. Schanck Ave., Pen Argyl, PA (US) 18072

( * ) Notice: Subject to any disclaimer, the term of this patent is extended or adjusted under 35 U.S.C. 154(b) by 0 days.

(21) Appl. No.: 09/881,539

(22) Filed: Jun. 14, 2001

(65) Prior Publication Data
US 2003/0041469 A1 Mar. 6, 2003

(51) Int. Cl.⁷ .............................. F26B 13/26; F26B 5/14; B43L 17/04
(52) U.S. Cl. .............................. 34/89.1; 34/330; 34/335; 34/355; 34/398; 34/95; 34/95.1; 15/244.1
(58) Field of Search .......................... 34/89.1, 329, 330, 34/332, 335, 353, 354, 355, 397, 398, 95, 95.1; 7/669; 15/244.1, 244.2, 244.3, 244.4, DIG. 15

(56) References Cited

U.S. PATENT DOCUMENTS

| | | | | |
|---|---|---|---|---|
| 3,784,998 A | * | 1/1974 | Jones ....................... | 15/209 R |
| 4,455,705 A | * | 6/1984 | Graham ....................... | 15/121 |
| 4,925,453 A | * | 5/1990 | Kannankeril ................. | 604/378 |
| 4,975,999 A | * | 12/1990 | Levy ........................... | 15/210 |
| 5,159,735 A | * | 11/1992 | Owens et al. ............ | 15/104.94 |
| 5,230,119 A | * | 7/1993 | Woods et al. .............. | 15/209.1 |
| 5,240,339 A | * | 8/1993 | DeForest et al. ........... | 401/207 |
| 5,528,791 A | * | 6/1996 | Wilson ....................... | 15/119.2 |
| 5,960,509 A | * | 10/1999 | Wu ........................... | 15/244.2 |
| 6,044,515 A | * | 4/2000 | Zygmont .................... | 15/209.1 |
| 6,101,661 A | * | 8/2000 | Policicchio et al. .......... | 15/228 |
| 6,311,361 B1 | * | 11/2001 | Cole ............................ | 15/227 |

* cited by examiner

Primary Examiner—Ira S. Lazarus
Assistant Examiner—K. B. Rinehart
(74) Attorney, Agent, or Firm—Charles A. Wilkinson; Clinton H. Wilkinson

(57) ABSTRACT

A device for absorbing or blotting grease from the surface of foods such as pizza comprising a support member having a handle for manually gripping the device and an absorbent or oligiophilic pad attached to such support member for blotting the surface of a food item.

16 Claims, 6 Drawing Sheets

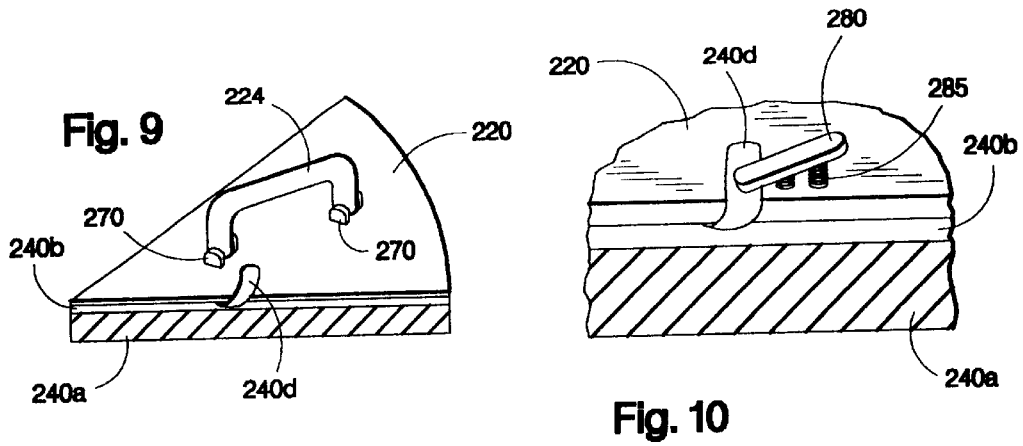
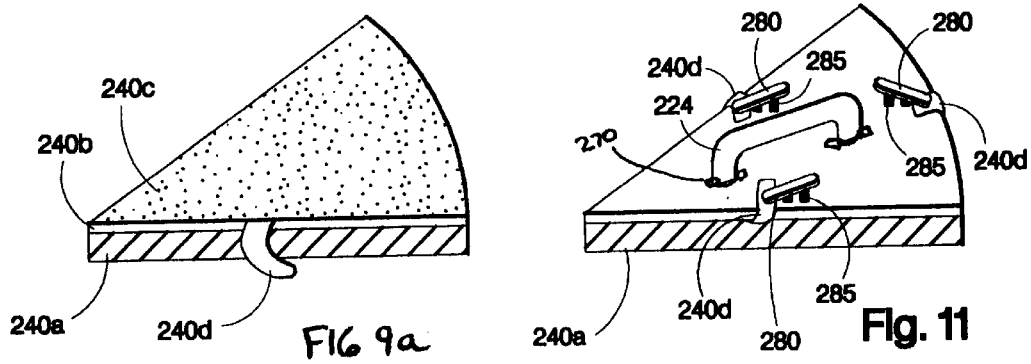
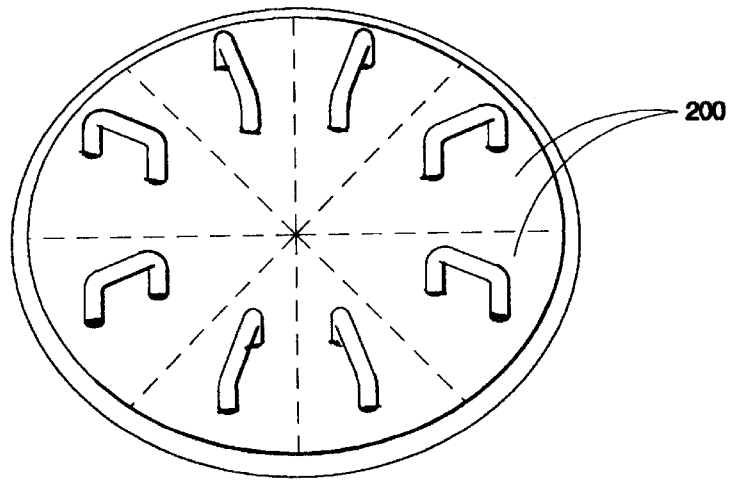

DEVICE FOR REMOVING GREASE FROM THE SURFACE OF A FOOD ITEM

BACKGROUND OF THE INVENTION

1. Field of the Invention

This invention relates generally to devices for removing grease from food items, and more particularly to a device for absorbing or blotting grease from the surface of delicate food items such as pizza.

2. Preliminary Discussion

Scientists are learning more and more every day about the deleterious effects of excess fat and fatty foods on the human body. Such information has made consumers increasingly conscious of their eating habits in general, causing them to try to minimize the amount of fat or oils contained in their diets. At the same time, the average consumer is also working longer hours and generally has a very busy or hectic schedule, leaving less time to satisfy his or her hunger pangs or appetite. Consequently, "fast food" has become a standard part of the diet of the working population. However, while "fast food" can quickly satisfy such hunger pangs, over the long term healthier foods and a balanced diet are required for nutritional sustenance for consumers to remain healthy, alert, and productive.

One "fast food" that has enjoyed increasing popularity in recent years is pizza. Pizza has several advantages over other fast foods. First, many consumers believe that pizza smells and tastes better than more traditional fast foods such as hamburgers, fried chicken, french fries, tacos, or the like. In addition, unlike many other fast foods, pizza can be easily reheated without losing much of its original flavor. Another advantage is that pizza is often delivered, so workers do not have to wait in line or even leave their homes or offices for such pizza to be served. Pizza is also often consumed in a group setting, since a single large pizza pie can usually satisfy the appetite of three of four normal sized persons. A further advantage of pizza over other "fast foods" is that consuming a slice or slices of pizza is generally considered healthier than consuming other higher-fat, lower carbohydrate fast foods. For one thing, the pizza crust provides carbohydrates, and the cheese provides protein and calcium. In addition, a pizza may be topped with any number of vitamin and mineral rich vegetables, especially green peppers, broccoli, or spinach. Finally, pizza is not as subject to bacterial deterioration as some other foods, which, if left unrefrigerated, can quickly become dangerously infected with bacterial food poisoning agents.

Although pizza has numerous nutritional advantages over many other "fast foods," most pizzas contain a rather thick layer of cheese, which cheese contains large quantities of fat. When the pizza is cooked or heated in a pizza oven, the cheese melts, thereby causing grease to separate from the cheese and to collect or form in pockets on the surface of the pizza. Such condition can be even further aggravated if the pizza contains additional fatty toppings, such as pepperoni, Italian sausage, or ground beef, which release additional amounts of grease during heating. A further disadvantage is that since a pizza slice is usually consumed virtually immediately after it has been cooked or heated, the grease released from the cheese and toppings is still extremely hot and can severely burn the roof of one's mouth, which is not only painful, but may also damage the taste buds for a short or sometimes longer duration.

Thus, while it is well known that grease and fats add flavor to many foods, most consumers try to remove at least some of the excess pools or pockets of grease from the surface of a pizza slice prior to eating, generally to decrease the overall fat content of such slice. One method commonly employed to remove grease from the surface of a slice of pizza is to fold or bend the slice so that the grease is channeled generally into the center portion of the fold, wherein the slice is tilted at an angle so that the grease flows off. However, while this removes some of the grease from the food item, overall folding is not very effective, since a significant amount of grease will remain on the surface absent complete mangling of the slice. In addition, by the time a consumer is ready to consume a second or third slice, such slices will have significantly cooled, allowing much of the grease to resolidify. Thus, using this method, a consumer usually cannot remove a satisfactory quantity of grease, and a relatively large quantity is still consumed during eating.

Another commonly employed method is to blot the slice by hand using an absorbent implement such as a paper napkin or towel. Although overall this method may remove more grease than folding, often pieces of the napkin or towel will tear off and become stuck on the surface of the cheese. Such method is also generally inefficient and messy. In addition, blotting using a regular napkin or towel is also usually only practical to remove grease when the food is hot or essentially right out of the oven, since the grease will solidify quickly at room temperature. Thus, it rapidly becomes difficult or even impossible to remove most of the grease from the entire surface of foods such as pizza shortly after cooking unless the food is reheated so that the temperature of the food is once again high enough for the grease to liquefy.

3. Description of Related Art

While there are numerous devices known in the prior art for absorbing liquids or moisture generally, and more specifically for blotting or removing grease, none of such devices claims the particular advantages of the inventor's device, which can be used to quickly and easily remove most of the grease from the surface of a hot food such as pizza or other foods where the grease accumulates on the surface of the food without the food item itself becoming mangled or otherwise misshapen or damaged during the removal process.

Bag-like structures having a grease absorbent lining material for absorbing grease, such as disclosed in U.S. Pat. No. 3,070,899 issued to J. P. Lappin, Jr. on Jan. 1, 1963, entitled "Absorbent Device to Absorb Grease from Articles," are well known. When greasy foods are placed in the bag and the bag is shaken vigorously, grease is transferred from the food onto the absorbent material. U.S. Pat. No. 4,984,907 issued to B. Power on Jan. 15, 1991, entitled "Grease Absorbent Device," discloses similar bag-type grease absorbing device into which greasy foods are placed immediately after cooking and gently shaken. U.S. Pat. No. 5,353,518 issued to L. H. Lee on Oct. 11, 1994, entitled "Implement to Blot Grease from Solid Foodstuff," also discloses a similar bag-like structure which uses an air-evacuating pump means such that when the pump is turned on, the absorbent layer is pulled tightly against the foodstuff, causing the grease to be blotted onto the absorbing material. Although such devices are useful for removing grease from the surface of deep-fried or relatively solid foods, they could not be used on pizza-like foods, since such foods would be essentially destroyed by vigorous or even gentle shaking.

U.S. Pat. No. 4,071,921 issued to D. E. Jury on Feb. 7, 1978, entitled "Disposable Grease Absorbing Mitt," discloses a grease-absorbing pad having a mitt-like pocket into which the hand of the user is slipped. Such mitt, however, is designed to absorb grease in a cleaning task, and the Jung reference does not teach use of the mitt for absorbing grease directly from the surface of foods.

Absorbent pads are also well known for other specific uses, such as in U.S. Pat. No. 4,381,611 issued to M. Wishman on May 3, 1983, entitled "Method and Apparatus for Absorbing Moisture," which discloses a pad that is primarily intended for absorbing body perspiration and other body fluids. Another example is found in U.S. Pat. No. 4,475,836 issued to A. Colognori on Oct. 9, 1984, entitled "Backscrubber and/or Backscratcher with Removable Sponge Element," which discloses a sponge and handle element for scrubbing or scratching one's back. U.S. Pat. No. 5,212,847 issued to J. R. Melcher on May 25, 1993, entitled "Swab and Method of Manufacturing and Using It," discloses an applicator consisting of a sponge-like absorbent pad and a handle having rearwardly extending barbs which extend into the pad to secure the handle in place. Finally, U.S. Pat. No. 5,664,281 issued to D. L. Pelfrey on Sep. 9, 1997, entitled "Suntan Lotion Applicator, discloses an applicator having a circular shaped sponge pad for applying suntan lotion to the body and having an adjustable elongated handle for holding the sponge. Such references are not designed for absorbing grease from foods, however, and pieces of the pad surface might easily come loose and lodge in the food itself.

Grease absorbing pads are also commonly used in connection with microwaveable foods such as frozen dinners and the like. For example, U.S. Pat. No. 5,414,248 issued to B. M. Phillips on May 9, 1995, entitled "Grease and Moisture Absorbing Inserts for Microwave Cooking," discloses a pad designed to remove excess grease and moisture from foodstuffs in microwaveable food containers. Such pads are designed primarily to be placed underneath foodstuffs, however, rather than to blot the surface of foods. U.S. Pat. No. 5,814,396 issued to R. J. Weidner on Sep. 29, 1998, entitled "Grease Absorbing Pad," discloses another pad designed to remove grease from foods during cooking in a microwave oven.

The inventor is also aware of several products designed to absorb grease from liquid or aqueous mixtures. U.S. Pat. No. 5,744,406 issued to R. J. Novak on Apr. 28, 19984, entitled "Method for Easy Removal of Fats, Oils and Grease from Mixtures with Water and Aqueous Components," discloses a pad for removing unwanted oils and fats from cooked foods without removing any desired water and nutrient salts. However, the Novak pads are designed to be dipped in liquid foods such as soups, and do not have a handle means such that the pads can be used simply for blotting the surface of a foodstuff. The inventor is also aware of a commercially available grease absorbing device called the "Fat Mop®," which is comprised of strips of absorbent material attached to a handle element, similar to a conventional mop, such that the strips are brushed over the surface of foods to absorb grease. However, the strips of the "Fat Mop®" cannot be used as quickly and efficiently as the present invention to absorb grease from larger items such as an entire pizza.

Thus, there is still a need for a product which is disposable and can be used to easily and quickly blot grease from the surface of foods such as in particular pizza slices or entire pizzas prior to consumption of such foods, and which product is safe and sanitary and is effective in removing a substantial portion of the grease that normally accumulates on the surface of foods during and immediately after baking or cooking.

OBJECTS OF THE INVENTION

It is an object of the present invention therefore to provide an article or device for blotting or removing grease from the surface of foodstuffs.

It is a further object of the invention to provide an article or device for blotting or removing grease from the surface of foodstuffs where the blotter is inexpensive to manufacture.

It is a still further object of the invention to provide an article or device for blotting or removing grease from the surface of foodstuffs wherein either the entire article or the blotting portion may be readily disposable.

It is a still further object of the invention to provide a disposable pad for blotting grease from the surface of foodstuffs such as pizza where such pad is shaped and sized to blot the surface of either a whole pizza or a pizza slice.

It is a still further object of the invention to provide a device for blotting grease from the surface of foodstuffs such as pizza comprising a corrugated cardboard support or holding member having a die cut handle portion to facilitate manipulation of a pad portion, which pad portion contacts the surface of the foodstuff.

It is still a further object of the invention to provide a plurality of such devices in the form of a kit.

Still other objects and advantages of the invention will become clear upon review of the following detailed description in conjunction with the appended drawings.

SUMMARY OF THE INVENTION

An article or device for blotting grease and oils from the surface of foodstuffs such as pizza is provided. The blotter consists essentially of a disposable pad and a support or holding member for such pad. In one preferred embodiment, the support member is made from inexpensive corrugated cardboard generally cut in the same shape as the pad, with the pad secured to one side of the support member. The corrugated cardboard support or holding member preferably includes a die cut handle which handle is moved to a raised position when the device is to be used to blot grease from the surface of a food item, wherein the pad is placed in light or soft contact with the surface of the foodstuff for a time sufficient for a large portion of the grease to be absorbed into the pad. Once the pad has been used, it can either be removed from the support member and discarded and a new pad secured to the holder, or, alternatively, the entire blotting device can be discarded. The size and shape of such pads can be varied to accommodate different sized dishes such as whole pizza pies, individual slices, or other foods such as soups or other food items where grease normally accumulates on the surface during cooking. In another embodiment, the support or holding member is preferably made from plastic, and the absorbent pad is secured to the support member either by an adhesive on the upper surface of the pad or through the use of tabs on the pads which are secured to the top surface of the support member by a clamping means. Such tabs may also be used to remove a used pad from the support member without having to touch such pad. The inventor contemplates that his food blotting device can be used both by restaurants and fast food establishments as well as by individuals, and may be sold in a package or kit form containing a quantity of blotters for consecutive use on pizza-type food or pizza slices, or wherein blotters of various shapes or sizes would be provided as convenient or desired for removal of grease from various shapes or sizes of pizza-type food items. The inventor's device provides a simple and inexpensive means for removing grease from the surface of heated food items, and particularly delicate food items such that the food item is not mangled or otherwise altered.

BRIEF DESCRIPTION OF THE DRAWINGS

The foregoing and other objects, features, and advantages of the present invention will be more apparent from the following particular description of the preferred embodiments as illustrated in the accompanying drawings in which reference characters refer to the same parts throughout the various views.

FIG. 3b is a side elevation of the blotting device of the invention offset ninety degrees from the view in FIG. 3a.

FIG. 9 is an isometric view of another alternative embodiment of the blotting device of the invention having a reusable support or holding member.

FIG. 9a is an isometric view of a disposable grease absorbing pad of the invention having an adhesive for securing the pad to the support member shown in FIG. 9.

FIG. 10 is an isometric view of a clamping means used to hold the tab shown in FIG. 9 in an upwardly inclined position.

FIG. 11 is an isometric view of an alternative embodiment of the invention having multiple tabs and clamping means.

FIG. 12 shows a package or kit of several blotting devices of the invention removably attached together along perforations or tear lines.

DESCRIPTION OF THE PREFERRED EMBODIMENTS

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

The present invention provides an improved means for easily and inexpensively blotting or otherwise removing excess grease and fats from the surface of hot foods. While in the preferred embodiment discussed below the blotting device is shown as created particularly for blotting grease from the surface of pizza, the inventor's blotting device could just as easily be adapted for use in connection with virtually any food or liquid wherein grease or other unwanted liquids accumulate on the surface of such food or liquid.

Figure 1:
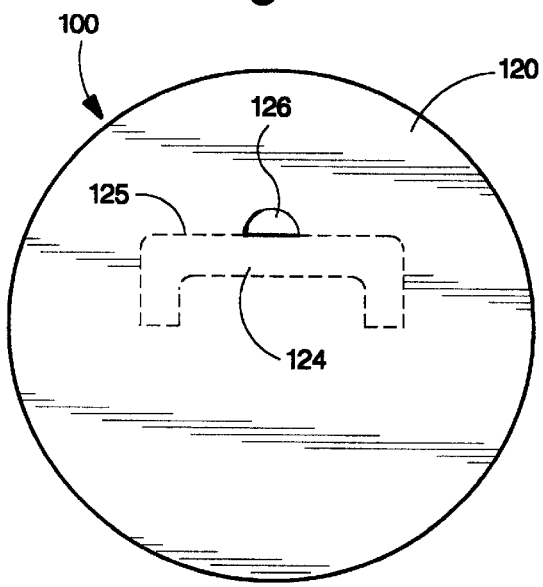
FIG. 1 is a top view of a preferred embodiment of the blotting device of the invention showing the top surface of the corrugated cardboard support or holding member.

FIG. 1 is a top view of a preferred embodiment of the grease-absorbing device 100 of the present invention. The device 100 is preferably generally circular in shape, i.e. in the shape of a standard or regular pizza. However, as will be illustrated below, the shape and size of the device 100 can be altered to fit foodstuffs or items of different sizes and shapes, with the number of such different shapes and sizes being virtually unlimited. The device 100 as shown in FIG. 1 will typically have a radius of approximately 7 inches, 11 inches or 13 inches, which is the approximate radius of a small, medium, or large pizza.

Figure 2:
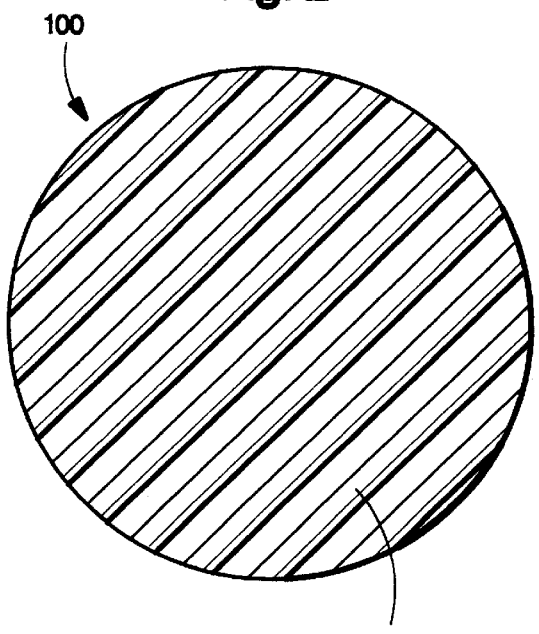
FIG. 2 is a bottom view of the blotting device of the invention showing the disposable grease-absorbing pad.

Device 100 is comprised of support or holding member 120 and absorbent pad 140 (shown in FIG. 2). Support member 120 is preferably made from a solid piece of corrugated cardboard, although another suitably stiff material such as thin plastic may also be used (see FIGS. 9–11 described below). Alternatively, less material can be used in making the support member 120 as long as the resulting structure is sufficiently rigid to support the weight of a saturated grease pad. Handle 124 is preferably die cut into the support member 120 along perforations 125, and a die cut hole 126 is positioned along one side of the handle 124, such hole 126 being generally in the shape of a semicircle and being large enough for a finger to fit into the hole and facilitate pulling up or raising of the handle 124 into the position shown in FIG. 3 in the normal manner.

FIG. 2 is a bottom view of the device 100 showing the food contacting surface of disposable pad 140. Pad 140 may be either removably or permanently secured to support member 120, depending on whether it is desired that the entire device 100 is to be discarded after use or if the support member 120 is to be reused with another pad. If support member 120 is to be reused, pad 140 may be secured to such support member by an adhesive, Velcro® type fasteners, or other suitable means. See also FIGS. 9–11. However, it is important that such securing means be sufficiently strong to support or hold the pad 140 to the handle 120 after the pad has been saturated with grease, which, of course, will substantially increase the weight of the pad. The pad 140 is preferably in the same shape and size as the support member 120.

The exact material used in making the pads 140 can vary depending on the thickness or absorbency desired. However, preferably a fabric material which is oleophilic and hydrophobic is used so that generally only the unwanted grease and oil is absorbed and not other nutrients or components of the foodstuff. However, pads made from paper, gauze, cheesecloth or other materials may also be used. Since the pads 140 will be in direct contact with the surfaces of foods, the material must not flake off and stick to or remain on the food surface. In addition, the material must be non-toxic and must not affect or alter the quality or taste of the food. In the preferred embodiment, the grease absorbing material is of a sufficient thickness and pliability such that when it is contacted with the surface of a foodstuff, such as a pizza containing toppings, the pad will flex or generally conform to the outline of such surface so that grease situated below and between such toppings can also be easily blotted and absorbed.

Figure 3A:
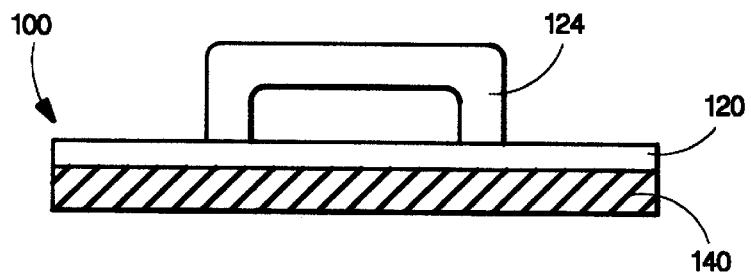
FIG. 3a is a side elevation of the blotting device of the invention with the handle in a raised position.
Figure 3B:
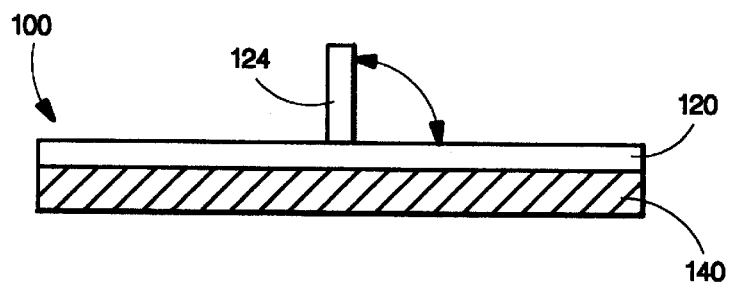
Figure 4:
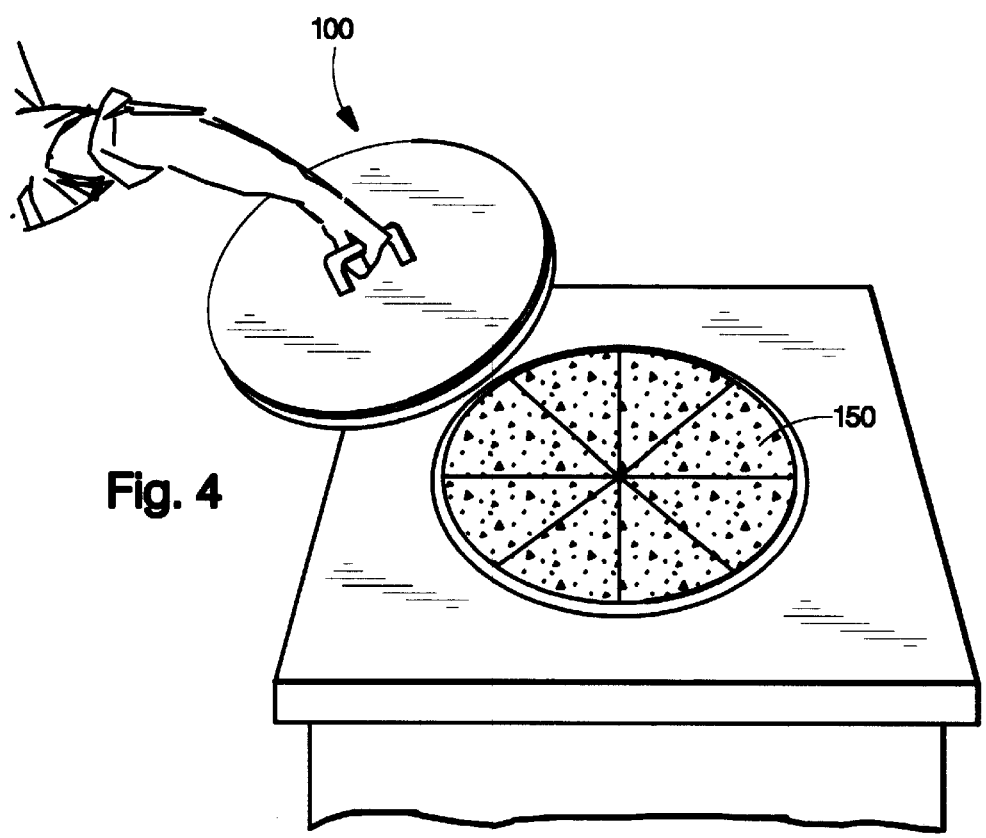
FIG. 4 is an isometric view of the blotting device of the invention showing the device positioned over a whole pizza just prior to use.
Figure 5:
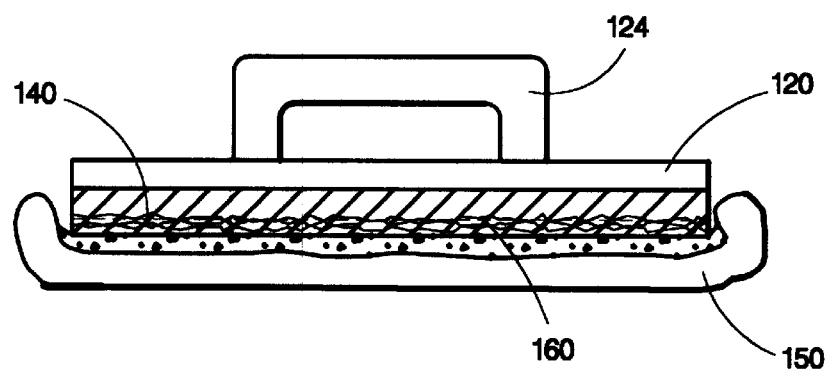
FIG. 5 is a side elevation showing the blotting device of the invention contacting the surface of a foodstuff.

FIG. 3a is a side elevation view of the blotting device 100 showing the handle 124 in a raised position ready for use, while FIG. 3b is another side elevation view offset ninety degrees from the showing of the invention in FIG. 3a. The arrow in FIG. 3b illustrates movement of handle 124 between a storage or vending position and a raised position. FIGS. 4 and 5 shows the device 100 being used to blot grease from the surface of a pizza 150. To use the device 100, as shown in FIG. 4, the user will first move the handle 124 from the storage or vending position shown in FIG. 1 to the raised position shown in FIG. 3a. Next, the user will grasp the handle 124 and position the pad portion 140 over the pizza 150 or other foodstuff, and (see FIG. 5) lightly contact the bottom surface of the pad 140 with the top surface of the food. The pad 140 should be in contact with the pizza 150 for at least several seconds or until the grease 160 has a chance to be absorbed into the pad 140, as illustrated by the darkened portion of pad 140. When using the device, the pizza 150 should still be relatively hot, and preferably right out of the oven, so that a maximum amount of grease and oil is in liquid form and thus may be absorbed into the pad 140.

The surface of the food item may be contacted several times consecutively, allowing the grease to be absorbed further between contacts and allowing the user to monitor the surface of such food item between blottings to determine if sufficient grease has been removed. In addition, as indicated above, some types of foods release more grease and oils depending on the cooking conditions and particular ingredients used during cooking, such as ground beef, sausage, or pepperoni, which particularly tend to release more grease over that which will be released by the customary grease or fat released from the heated cheese of the usual pizza.

Figure 6:
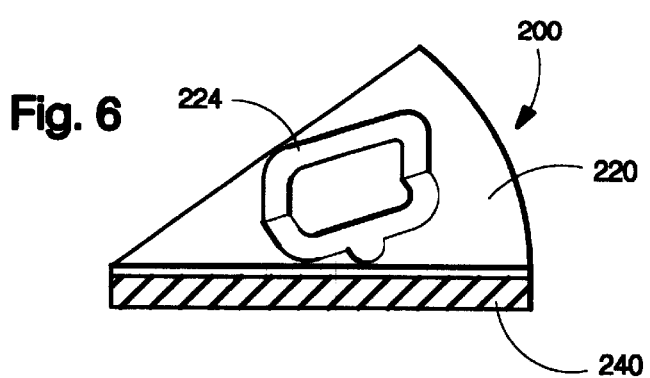
FIG. 6 is an upper isometric view of another preferred embodiment of the invention shaped to fit a typically sized pizza slice.
Figure 7:
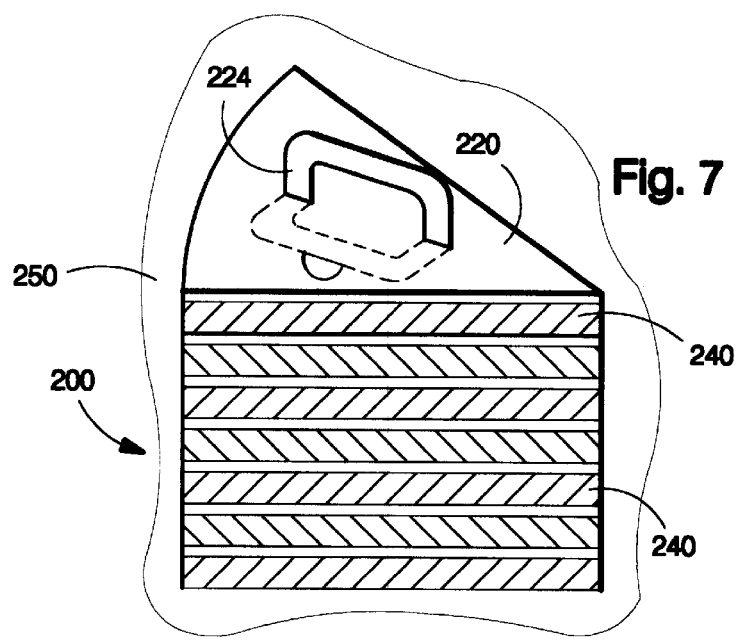
FIG. 7 is an isometric view of several blotting devices as illustrated in FIG. 6 packaged and sold as a unit.

A still further alternative embodiment of the invention is shown in FIG. 9, similar to FIGS. 6 and 7, in which there is provided a reusable support or holding member 220 constructed of any suitable material such as plastic, and a disposable oleaginous, or grease, absorbent pad 240a having an adhesive layer 240b on the top of upper surface. Preferably, there is initially a thin protective layer 240c of material having the same shape of the surface of the pad attached to the back of the grease absorbent pad to protect or prevent the adhesive from adhering to anything until the protective layer is removed by stripping off (see FIG. 9a). The absorbent pad material 240a then secured to the lower surface of the backing or holder 220 by adhesive layer 240b and is ready for use. Preferably, there is a tab 240d extending from one side of the absorbent pad with a preinduced inclination to bend upwardly away from the surface of the food item from which grease is to be absorbed. This tab provides a hand or finger hold tostrip the fat impregnated pad away form the surface of the holder 220 after excess grease is removed from the food item being treated. The preinduced upward inclination of the tab 240d prevents such tab from becoming grease-coated so that it can be used to strip the absorbent pad from the surface of the holder after use without soiling the fingers of the user. In addition, in the embodiment shown in FIG. 9, handle 224 is attached to holder 220 by hinges 270.

Often, pizza shops sell pizza by the slice in addition to whole pies. In such case, a shop will usually keep one or several pizzas in the shop already cooked and will heat or reheat the slices as needed. As a result, the inventor has provided a modified blotting device 200, shown in FIG. 6, wherein support member 220 and handle 224 are preferably made from the same corrugated cardboard material as in the embodiment shown in FIGS. 1–5, but which have been cut in the usual substantially triangular shape of a typical slice of pizza. In using such alternative embodiment, as soon as or shortly after a slice or slices are removed from the pizza oven after reheating, the pad portion 240 of the device 200 will be contacted with the slice in essentially the same manner as described above, with the user holding handle 224. In addition, the inventor envisions that his grease blotters may be sold in the packages of, for example, ten or twenty blotters at a time. In the folded position, the blotters can be easily stacked and shipped as shown in FIG. 7 in vacuum-sealed packaging 250.

Figure 8:
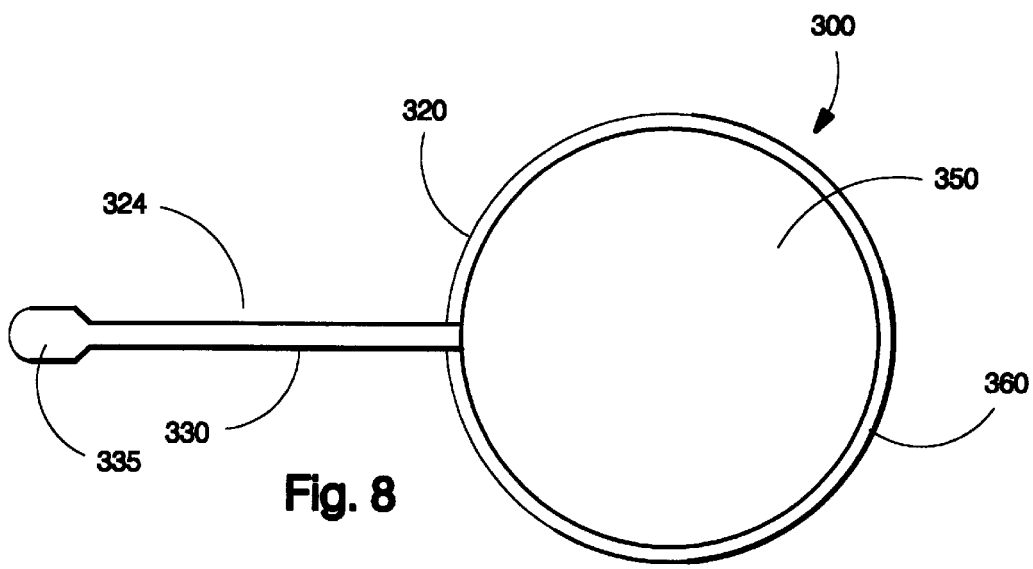
FIG. 8 is a top view of another alternative embodiment of the blotting device of the invention incorporating an elongated handle.

FIG. 8 shows a further alternative embodiment of the blotting device 300 having a different type of support member 320. In FIG. 8, rather than having the handle 324 of the support member 320 positioned above the pad holding portion 350 of the device 300, the support member 320 is held by an elongated arm 330 having a gripping portion 335. Additionally, depending upon the rigidity of the pad being used, a rigid member 360 may be placed around the periphery of the pad to prevent the pad from drooping when it becomes weighted down with grease.

A still further alternative embodiment of the invention is shown in FIG. 9, similar to FIGS. 6 and 7, in which there is provided a reusable support or holding member 220 constructed of any suitable material such as plastic, and a disposable oleaginous, or grease, absorbent pad 240a having an adhesive layer 240b on the top or upper surface. Preferably, there is initially a thin protective layer 240c of material having the same shape of the surface of the pad attached to the back of the grease absorbent pad to protect or prevent the adhesive from adhering to anything until the protective layer is removed by stripping off (see FIG. 9a). The absorbent pad material 240a is then secured to the lower surface of the backing or holder 220 by adhesive layer 240b and is ready for use. Preferably, there is a tab 240d extending from one side of the absorbent pad with a preinduced inclination to bend upwardly away from the surface of the food item from which grease is to be absorbed. This tab provides a hand or finger hold to strip the fat impregnated pad away from the surface of the holder 220 after excess grease is removed from the food item being treated. The preinduced upward inclination of the tab 240d prevents such tab from becoming grease-coated so that it can be used to strip the absorbent pad from the surface of the holder after use without soiling the fingers of the user. In addition, in the embodiment shown in FIG. 9, handle 224 is attached to holder 220 by hinges 270.

Since it is difficult to provide a permanent inclination of the tab 240d away from the major dimension of the basic pad, and even with such an inclination it may still become soiled with grease during blotting of the comestible product such as a pizza, it is preferable to provide a small clamp 280 on the upper surface of the holder 220 under which the tab 240d can be secured during use to protect it from soiling or contamination with grease. Such clamp piece can be held closed in any suitable manner such as by a toggle action clamp or a clamp 280 with a small spring 285 under the upwardly extending handle of the clamp as shown in more detail in FIG. 10. As will be recognized, any suitable clamping mechanism can be used so long as its position with respect to the holder is such that it is out of the way of any soiling by grease.

In the use of the device of the invention with the clamp arrangement, after the device of the invention is used, the tab 140d is released from the clamp 280 and used to grasp the absorbent pad and strip it from the surface of the holder 220. A new protective material 240c stripped from adhesive surface 240b, and the fresh pad placed against the bottom of the holder in a position such that its adhesive surface temporarily bonds with the bottom surface of the holder. The tab 240d extending from the side of the absorbent pad is bent upwardly partially over the upper surface of the holder 220 and positioned under the spring clamp 280 out of the way of the blotting action during use of the device. After blotting of the comestible item, the clamp 280 is released by finger action and the released tab 240a from the surface of the holder 220, and another identical but unused absorbent pad is adhered to the surface of the holder.

The spring clamp 280 not only serves to retain the tab 240d away from contamination with grease, but may also aid in retaining the absorbent pad against the surface of the holder. As will be recognized, therefore, rather than relying upon a temporary adhesive to retain the absorbent pad on the holder, the pad could have multiple tabs 240d as shown in FIG. 11 and the holder 220 also may be provided with multiple clamps 280 to retain the pad against the lower surface of the holder during use. In such case, at least three equally spaced tabs 240d on the absorbent material and clamps on the holder should be available, with more tabs and clamps preferred on larger absorbent sections. Adhering the absorbent pad to the bottom of the holder and using only one tab to remove it, plus clamping such tab out of the way, is a preferred arrangement, however, because of the relative simplicity and convenience for the user. In FIG. 11, it will be noted that while three tabs are shown, no adhesive layer 240b or protective strippable layer 240c is shown. Instead, only a unitary segmented absorbent material is shown.

FIG. 7, as indicated above, shows an isometric view of a package or kit of a multiple collection of essentially triangular shaped disposable absorbent pads in accordance with the invention. As indicated, these absorbent pads could also be for use on a whole pizza, in which case they would be circular. They could also be half-circular or semicircular and designed for blotting half a pizza or the like at a time. In FIG. 12 there is shown such a package or kit having a full round blotter arrangement, but with tear lines in the pad whereby it may be segmented into as many segments as necessary. In this arrangement, each individual segment will preferably be supplied with an unfoldable handle. When more than one segment is used at a time, two handles may be unfolded and two hands used in the blotting operation.

It is also convenient to provide one of the grease absorbent devices shown in

Figure 13:
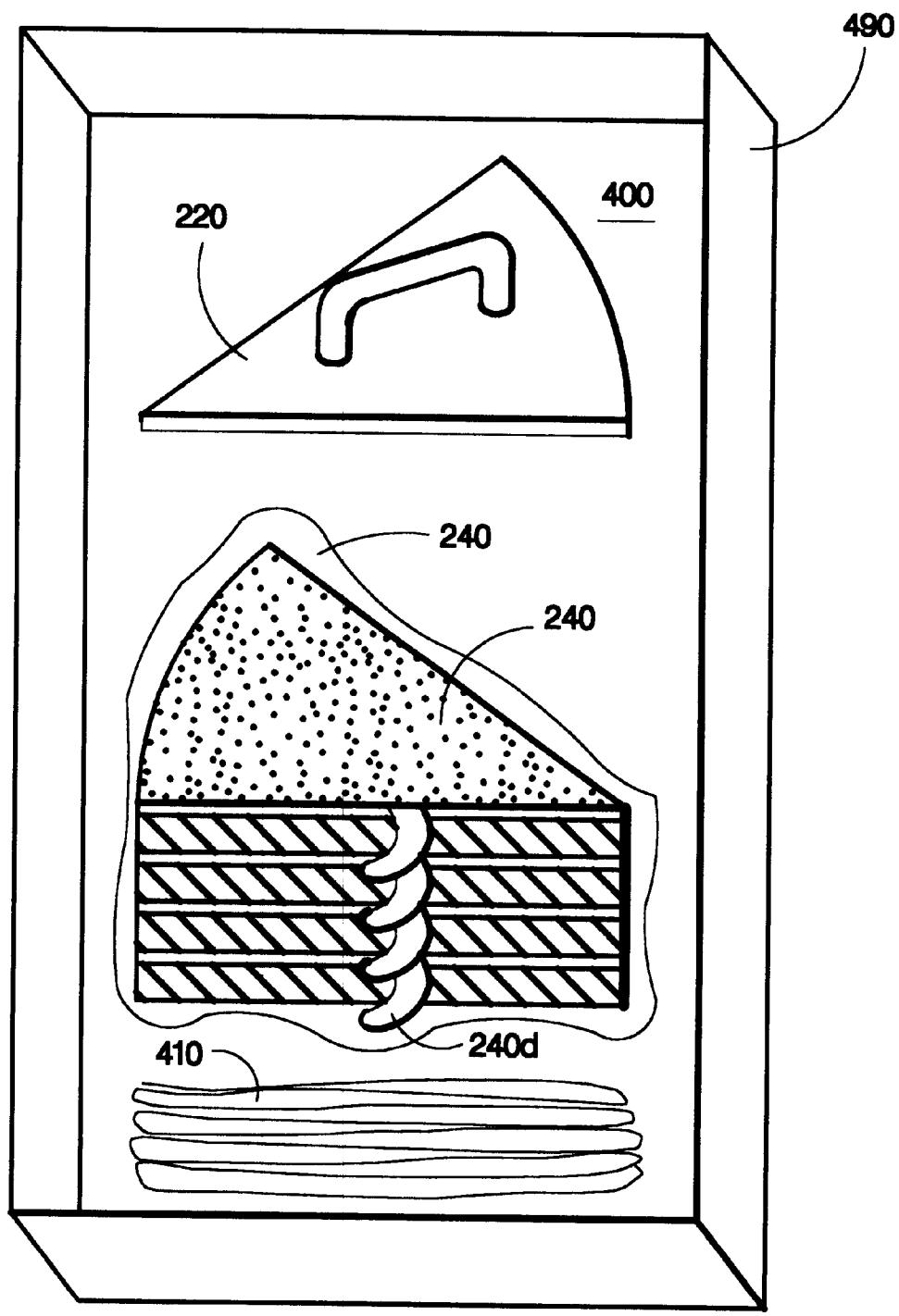
FIG. 13 shows several blotting devices disclosed in FIGS. 9–11 in kit form.

FIGS. 9, 10 and 11 in kit form, and this is shown in FIG. 13, where a segmented holder 220 and a series of refills of blotting elements 240 are packaged together as a kit. Each segmented absorbent refill is preferably provided with its own tab 240d for stripping the used absorbent pad from the holder after use and a protective film or other thin protective or shielding material on its adhesive surface for protection of the absorbent pad adhesive surface until used. A series of absorbent pads 240 are preferably provided in a separate package 250 within the kit (show as a simple box shape 490) and there is also preferably provided a larger plastic container, preferably in the form of a plastic bag 410 (shown folded in the kit) or the like into which used absorbent pads may be placed to protect the environment during transportation of the grease impregnated pads to waste and the like.

Figure 14:
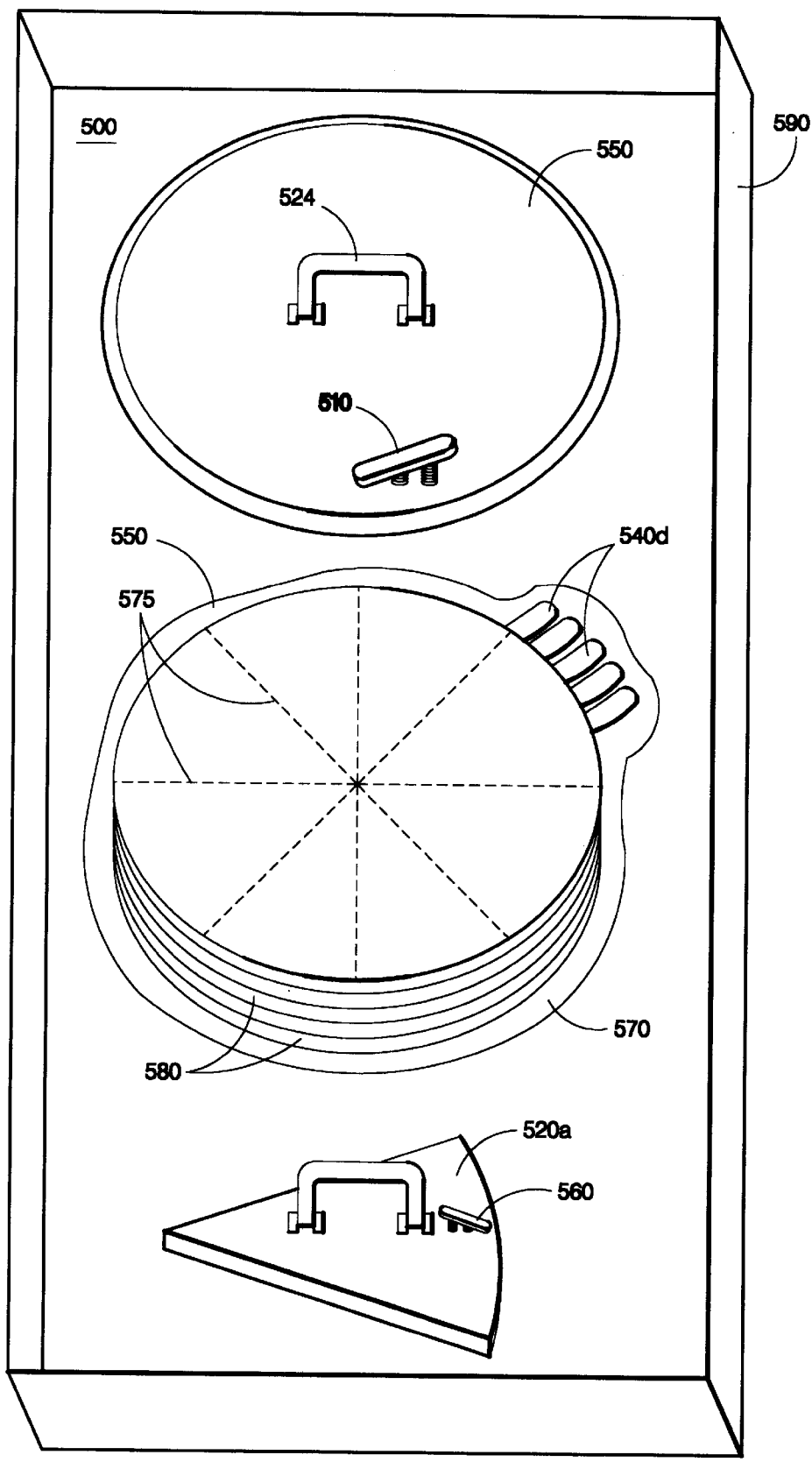
FIG. 14 shows another kit combining several of the blotting devices of the invention.

A complete kit 500 of both a full circular pizza treatment apparatus plus a segmented pizza treatment apparatus may be provided as shown in FIG. 14. In such case, there will be two holders, one of which 520a is round and the other of which 520b is segmented, plus a supply of absorbent pads for each 570 in package 550. In a preferred arrangement, the absorbent pads 570 will be provided in full circular form with tear lines 575 provided to facilitate detachment of separate segments 580 for use in the segmented holder 520b. Each of the holders 520a and 520b is provided with a spring clip 510 on the surface to hold the tabs extending from the side of the handles. In each of FIGS. 13 and 14, the components of the kit are contained in a rectangular container 490 and 590, respectively, which may be of cardboard or any other suitable material and may be covered by a clear plastic, not shown. The container may have in each case a slightly raised bottom with indentations for nesting the apparatus in the bottom of the container.

As may be appreciated, the absorbent or oligiophilic pads may be made of any suitable material such as essentially paper fibers, cotton fibers or plastic fibers. These fibers are preferably unwoven and gathered into a pressed fiber mat preferably with an oleoophobic rear or upper section. The absorbent portion is composed preferably of large numbers of packed fibers providing large numbers of interconnected, interstitial spaces for reception and retention of oil. Suitable olegio absorbent pads or materials are taught, for example, in U.S. Pat. Nos. 3,764,527 issued Oct. 9, 1973 to W. E. Sohl and 5,814,396 issued Sep. 29, 1998 to R. J. Weidner et al. the disclosures of which are hereby incorporated in the present application. The technology for such materials is relatively highly advanced and the present inventor makes no claim to a new absorbent material, but only to a new apparatus and method of using such absorbent material, particularly in the preparation of pizza for immediate consumption. In addition, while the device is specifically designed to be used with relatively delicate food items such as pizza wherein rough contact with such food items will mangle or otherwise damage such item, it should also be understood that the device may be used in an equally effective manner to remove grease from surface of heartier food items such as french fries, meats, and other food items. Of course, such grease can either be of a type released from the food itself during cooking, or also may be in the form of grease or oil that is commonly applied to the food item to facilitate cooking, such as used in a deep fryer or the like, or any other type of grease or oil.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A device for absorbing unwanted liquids from the surface of a food item wherein the physiologically safe, oleophilic pad is temporarily secured to the substantially planar support member by a suitable adhesive and the tab is usable to strip the pad from support member preparatory to mounting a new pad on the support member and discarding the stripped off pad.

2. A grease blotting device for removing grease and oil from the surface of a recently cooked food item by contacting the food item with an absorbent pad, comprising:
    an absorbent pad;
    a support member having a first and second side, said support member being secured on the first side to the absorbent pad, the support member having an integral outwardly pivotable handle for gripping the device during blotting use on the second side;
    at least one holding tab secured to the absorbent pad to facilitate removal of the pad from the support member; and
    a clamping means on the support member for securing the holding tabs to the support member.

3. A grease blotting device in accordance with claim 2 wherein the absorbent pad is secured to the support member by a temporary adhesive that can be overcome by tension of the holding tab.

4. A device for absorbing unwanted liquids from the surface of a food item comprising:

a substantially planar support member having first and second sides;

a physiologically safe, oleophilic pad secured to the first side of the support member;

a handle for gripping the device secured to the second side of the support member;

the support member having sufficient rigidity to support the weight of the absorbent pad when said pad is substantially completely saturated with unwanted liquids.

wherein the pad is temporarily securable to the support member and wherein at least one tab is secured the oleophilic pad to facilitate removal of the pad from the support member without touching the pad.

5. The device for absorbing unwanted liquids in accordance with claim 4 additionally comprising at least one clamping means secured to the second side of the support member for clamping the tabs to the support member.

6. The device for absorbing unwanted liquids in accordance with claim 4 wherein the pad is resistant to wetting by water.

7. A method of removing grease from the surface of a heated foodstuff comprising providing a grease absorbent pad material in planar orientation attached to a handling and support member having a foldable handle section and dimensions similar to that of the absorbent pad material and proceeding thereafter in the steps of pivoting the handle portion into an extended position and grasping the grease absorbing device by the handle portion, contacting the grease absorbing pad with the surface of the food for a sufficient period of time to allow grease and oils to be absorbed from the surface of the food into the grease absorbing pad.

8. A method of removing grease from the surface of a heated foodstuff in accordance with claim 7 wherein the food is a pizza product having a lower and upper surface and is contacted on the upper surface by the grease absorbent pad to remove grease and residual oil from the upper surface of said pizza product.

9. A method of removing grease from the surface of a heated foodstuff in accordance with claim 8 wherein the grease absorbent pad material has a flexible composition and is pressed intimately but lightly into contact with the upper surface of the pizza product in order to conform to the upper surface of the pizza product and remove grease and residual oil from depressed portions of the upper surface of the pizza product.

10. A method of removing grease from the surface of a heated foodstuff in accordance with claim 9 wherein the grease absorbent pad has a fibrous composition such that as the pad is pressed intimately into contact with the upper surface of the pizza product individual fibers and groups of fibers are dipped into any residual pools of oil and absorb such oil by a wick action.

11. A method of removing grease from the surface of a heated foodstuff in accordance with claim 9 where in the handling and support member is formed from die-cast cardboard and the grease absorbent pad material and handling and support member attached thereto is disposed of in waste after being pressed into contact with the surface of a pizza product.

12. A method of removing grease from the surface of a heated foodstuff in accordance with claim 9 wherein the grease absorbent pad material is independently attached to the handling and support member and is detached therefrom subsequent to being pressed against the upper surface of the pizza product.

13. A method of removing grease from the surface of a heated foodstuff in accordance with claim 9 wherein the grease absorbent pad material is lightly contacted with the surface of the pizza product immediately after the product is removed from an oven while the product is still relatively hot.

14. A method of removing grease from the surface of a heated foodstuff in accordance with claim 10 wherein the grease absorbent pad is initially packaged with at least one other similar absorbent pad and is removed from the package, the foldable handle section is moved into an unfolded position raised with respect to the handling and support member and the fibrous grease absorbent material is pressed lightly upon the upper surface of the pizza product backed up by the handling and support member which is sufficiently rigid to maintain the surface of the pad in a generally overall planar orientation as the pad is pressed upon the upper surface of the pizza product.

15. A method of removing grease from the surface of a heated foodstuff in accordance with claim 14 wherein the handling and support member and the absorbent pad material have the configuration and dimensions of a full pizza and are used to remove grease and residual oil from the surface of an entire pizza at one time by pressing the absorbent pad aligned with the top of the pizza directly against the upper surface of the pizza.

16. A method of removing grease from the surface of a heated foodstuff in accordance with claim 14 wherein the grease absorbent pad material and the handling and support member are in the configuration of a wedge shaped piece of pizza and an individual piece of pizza is removed from a whole pizza product and the absorbent pad material pressed lightly against the pizza to absorb grease and residual oils.

\* \* \* \* \*